(12) United States Patent
Mizuno et al.

(10) Patent No.: US 6,854,125 B2
(45) Date of Patent: Feb. 8, 2005

(54) MAGNETIC HEAD

(75) Inventors: Osamu Mizuno, Osaka (JP); Yutaka Murakami, Hirakami (JP); Tohru Nakamura, Katano (JP)

(73) Assignee: Matshushita Electric Industrial Co., Ltd., Osaka (JP)

( * ) Notice: Subject to any disclaimer, the term of this patent is extended or adjusted under 35 U.S.C. 154(b) by 1 day.

(21) Appl. No.: 10/130,769

(22) PCT Filed: Oct. 26, 2001

(86) PCT No.: PCT/JP01/09462

§ 371 (c)(1),
(2), (4) Date: May 22, 2002

(87) PCT Pub. No.: WO02/39443

PCT Pub. Date: May 16, 2002

(65) Prior Publication Data

US 2002/0172102 A1 Nov. 21, 2002

(30) Foreign Application Priority Data

Nov. 7, 2000 (JP) .................................. 2000-338638
Jul. 13, 2001 (JP) .................................. 2001-213379

(51) Int. Cl.[7] .......................... G11B 11/10; G11B 5/02
(52) U.S. Cl. ............... 720/659; 369/13.23; 369/13.17
(58) Field of Search ................... 369/13.23, 13.17, 369/13.14; 360/125, 126, 127, 121, 123, 59

(56) References Cited

U.S. PATENT DOCUMENTS

| | | |
|---|---|---|
| 3,349,384 A | 10/1967 | Kohn |
| 4,189,759 A | 2/1980 | Bauck et al. |
| 4,328,521 A | 5/1982 | Pexton et al. |
| 4,343,025 A | 8/1982 | Kronfeld et al. |
| 4,724,500 A | 2/1988 | Dalziel |
| 5,126,903 A | 6/1992 | Matsuzaki |
| 5,184,263 A | 2/1993 | Fukakusa et al. |
| 5,467,237 A | 11/1995 | Takahashi |
| 5,590,095 A | 12/1996 | Chaya |
| 5,604,719 A | 2/1997 | Kakimoto et al. |
| 5,657,300 A | 8/1997 | Takahashi |
| 5,663,937 A | 9/1997 | Takahashi |
| 5,710,745 A * | 1/1998 | Getreuer .................. 369/13.23 |
| 5,910,867 A | 6/1999 | Takahashi |
| 5,963,402 A * | 10/1999 | Egawa et al. ................ 360/125 |

FOREIGN PATENT DOCUMENTS

| | | | |
|---|---|---|---|
| EP | 544302 | 6/1993 | |
| EP | 566998 | 10/1993 | |
| EP | 0592219 | 4/1994 | |
| EP | 714094 | 5/1996 | |
| JP | 63-191384 | 8/1988 | |
| JP | 63244432 A * | 10/1988 | ........... G11B/11/10 |
| JP | 3-104003 | 5/1991 | |
| JP | 4-31469 | 5/1992 | |
| JP | 4-254904 | 9/1992 | |
| JP | 04254904 A * | 9/1992 | ........... G11B/5/02 |
| JP | 5-128616 | 5/1993 | |
| JP | 5-250750 | 9/1993 | |
| JP | 05314404 A * | 11/1993 | ........... G11B/5/02 |
| JP | 5-325293 | 12/1993 | |
| JP | 6-60585 | 3/1994 | |
| JP | 6-176429 | 6/1994 | |
| JP | 7-129908 | 5/1995 | |
| JP | 9-245449 | 9/1997 | |
| JP | 10255205 A * | 9/1998 | ........... G11B/5/02 |
| JP | 10-261249 | 9/1998 | |
| JP | 10-269503 | 10/1998 | |
| JP | 10-269721 | 10/1998 | |
| JP | 10-312502 | 11/1998 | |
| JP | 2000132803 A * | 5/2000 | ........... G11B/5/02 |

* cited by examiner

Primary Examiner—William J. Klimowicz
(74) Attorney, Agent, or Firm—Merchant & Gould P.C.

(57) ABSTRACT

A magnetic head is configured so that an aspect ratio $w_0/h_0$ of a cross section of a coil (11) is set to be 1 to 4, or preferably, approximately 1.5. This configuration suppresses the heat generation in the magnetic head that performs the magnetic field modulation, without impairing the efficiency, thereby making the magnetic head suitable for high-frequency modulation.

8 Claims, 7 Drawing Sheets

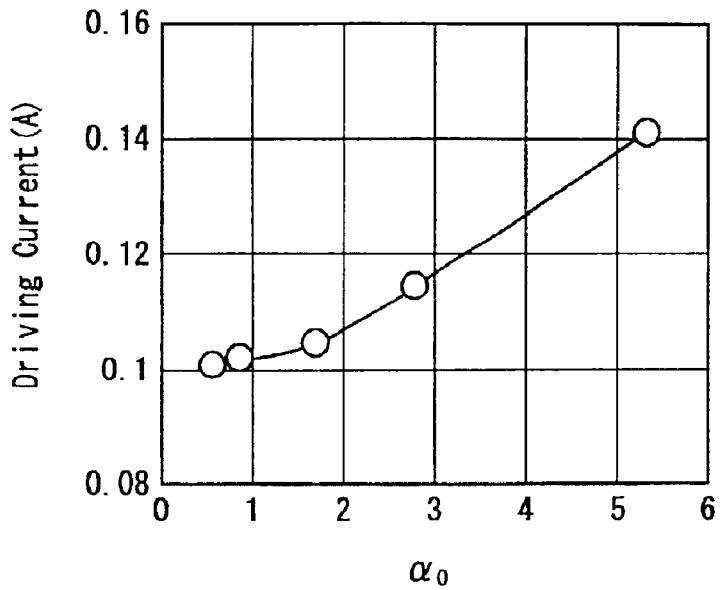
F I G. 2 A
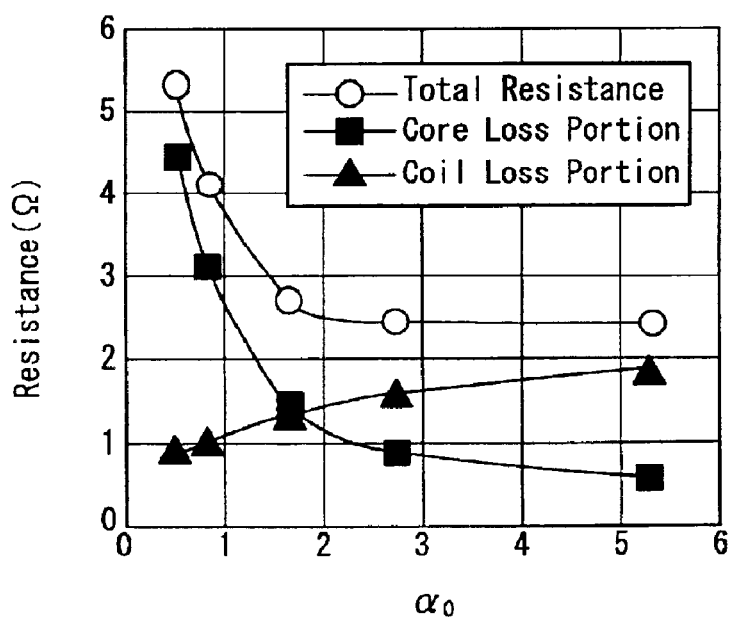
F I G. 2 B

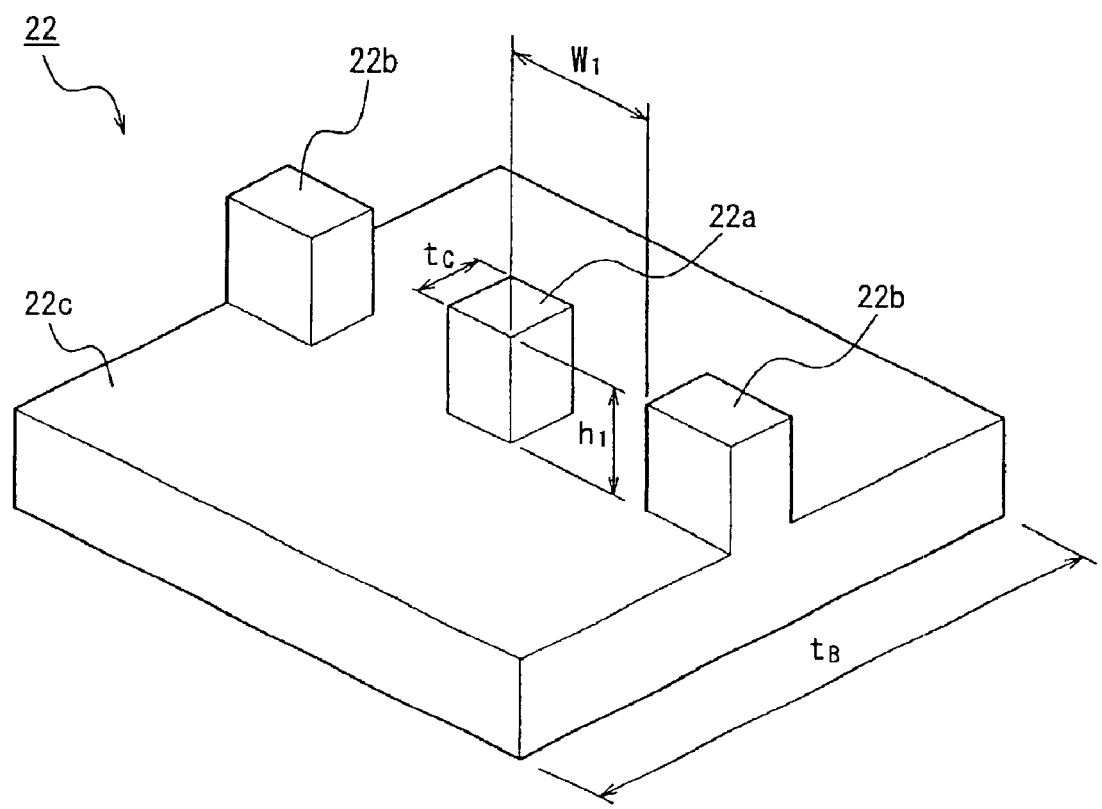
F I G. 4

MAGNETIC HEAD

TECHNICAL FIELD

The present invention relates to a magnetic head for recording or reproducing information with respect to a recording medium by applying a magnetic field to the same.

BACKGROUND ART

Typical conventional magnetic heads include those for use with mini-disks (hereinafter referred to as MDs). One example of such magnetic heads for MDs is disclosed by JP 7(1995)-129908A.

The MD is a kind of perpendicular thermomagnetic recording media employing magneto-optical recording techniques. In the magneto-optical recoding techniques, for recording, a medium locally heated by a laser beam to have a reduced coercive force is magnetized by applying thereto a perpendicular magnetic field modulated according to recording signals, so that perpendicular magnetic domains are formed therein. This modulated perpendicular magnetic field is generated by a magnetic head. For reproduction, the rotations of planes of polarization due to the Kerr effect of reflected light are detected so that magnetization directions of perpendicular magnetic domains are read.

MDs also are required to have higher transfer rates mainly in the case where they are used for data, pictures, etc., and this recently results in that modulated magnetic fields of higher frequencies are demanded.

The following will describe a configuration and operations of a conventional magnetic head for use in the magneto-optical recording technique, while referring to FIG. 8, which is a cross-sectional view of principal parts of the magnetic head. In FIG. 8, 1 denotes a recording medium such as a MD composed of a substrate 1a, a recording film 1b, and a protective film 1c. More specifically, other constituent elements such as a sliding film, a reflection film, etc. are included, but they are omitted herein. The recording medium 1 is moved by a mechanism (spindle motor, etc.), not shown in the drawing, in a direction indicated by an arrow A.

2 denotes an objective lens. The objective lens 2 allows a laser beam L from a light source to pass through the substrate 1a, and converges and focuses the same onto the recording film 1b.

51 denotes a coil as a source of magnetomotive force. 52 denotes a magnetic core made of a soft magnetic material. As a soft magnetic material, a ternary-compound-oxide magnetic material such as MnZn ferrite or NiZn ferrite is used preferably, which has relatively excellent high-frequency characteristics.

The magnetic core 52 is formed in an approximate "E" shape in which one center yoke 52a and two side yokes 52b are connected with one another via a base yoke 52c, and a coil 51 is wound and fixed around the center yoke 52a. A magnetic flux generated by the passage of electric current through the coil 51 is guided by the magnetic core 52, thereby causing a perpendicular magnetic field with an intensity necessary for recording to be applied to the recording film 1b. The coil 51 and the magnetic core 52 compose a magnetic head.

With respect to a MD, the magnetic core 52 is kept out of contact with the protective film 1c so as to avoid damage due to collision with the protective film 1c. However, from the viewpoint of the power consumption, the coil 51 preferably is arranged as close to the protective film 1c as possible in an acceptable range so that the efficiency of converting the driving current of the coil 51 into the magnetic field applied to the recording film 1b is increased.

Furthermore, assume that a height and a width on one side of a cross section of the coil 51 shown in the drawing are h0 and w0, respectively. In order to increase the efficiency of the conversion from the current of the coil 51 to the magnetic field, in the case where h0×w0 is set constant, that is, a cross-sectional area occupied by the coil 51 is set constant, it is more effective that w0/h0 decreases, that is, that the cross section of the coil 51 in the drawing have a more-vertically-elongated shape, in a certain range. This is because the cross section of the coil 51 in a vertically-elongated shape means that a width w1 of a magnetic gap that is a space between the center yoke 52a and the side yoke 52b decreases, which allows a magnetic resistance of an entirety of the magnetic head to decrease, thereby improving the efficiency. In the case of the shape shown in FIG. 8, w0/h0 is approximately 0.5.

Furthermore, in the case where the coil 51 has a cross section in a vertically-elongated shape, a mean diameter of the coil 51 decreases, which allows the center of the cross section of the coil 51 to be arranged closer to the center yoke 52a, thereby improving the efficiency also. In this case, the decrease of the mean diameter of the coil causes the coil resistance to decrease also, thereby reducing the power consumption of the coil.

When data are recorded, the coil 51 is modulated by a current according to a recording signal so as to generate a magnetic flux. The recording film 1b is subjected to a modulated magnetic field by the magnetic flux guided thereto by the magnetic core 52. Here, the laser beam L is converged and focused by the objective lens 2 on the recording film 1b, thereby heating the recording film 1b, causing its coercive force to decrease. Therefore, the record therein before the heating is erased. When the recording medium 1 moves in the arrow A direction, the temperature of the recording film 1b drops. As a result, the coercive force is recovered, and a modulated magnetic field exerted thereto currently is recorded.

However, the above-described conventional magnetic head has the following problems. When the modulated magnetic field is applied to the magnetic core 52, losses are produced, and mainly are converted into heat, thereby causing the temperature of the magnetic core 52 to rise. These losses include an eddy current loss and a hysteresis loss, which are present independently from a so-called copper loss produced due to the resistance of the coil per se. Considering the hysteresis loss in particular, in the case where the material characteristics are assumed to be constant, the loss is considered to be proportional to an integral of a magnetic flux density with a volume.

Since an increase in a modulation frequency leads to an increase in the number of hysteresis loops within a unit time, the energy consumption within a unit time increases. This causes the temperature of the magnetic core to rise. Further, since an increase in the dimension of h0 leads to an increase in the volume in an area with a high magnetic-flux density, an energy-consuming area of the core increases.

Generally, the magnetic permeability of a magnetic material has a temperature-dependent characteristic; the magnetic permeability abruptly drops when the temperature exceeds a certain level, and approximates the absolute permeability of vacuum when the temperature is in the vicinity of a Curie temperature. In other words, as the temperature of the magnetic core rises, a magnetic resistance increases, and a magnetic field is not generated sufficiently. Furthermore, in the case of a low-cost coil employing an insulation coating with a low heat resistance, there is a possibility that the coil could be burnt out by heat generated by the magnetic core. Furthermore, an increase in the magnetic resistance causes the number of interlinkage fluxes to decrease, thereby reducing an inductance of the magnetic head. Accordingly, in the case of a low-cost constant-voltage circuit or the like, the current passing through the coil increases due to a decrease in an impedance of the magnetic head, thereby generating further more heat, and sometimes causing a so-called thermal runaway state, which burns out the coil, and breaks down the circuit, etc. Consequently, the above-described conventional magnetic head, which is designed only for reducing an absolute amount of current, has a drawback in that the magnetic head is not suitably employed for high-frequency magnetic-field modulation recording.

DISCLOSURE OF THE INVENTION

The present invention has been made to solve the aforementioned problems, and it is an object of the present invention to provide a magnetic head that is capable of performing high-frequency magnetic-field modulation by employing easy and low-cost means.

To achieve the foregoing object, the present invention is configured as follows.

A magnetic head of the present invention includes a magnetic core and a coil for mainly applying a modulated magnetic field to a medium. In the case where, in an approximate rectangular-shape cross section of the coil, a dimension of the same in an excitation direction of the coil is expressed as $h0$, and a dimension of the same in a direction perpendicular to the excitation direction is expressed as $w0$, a ratio $\alpha 0$ ($=w0/h0$) is set so as to satisfy $1 \leq \alpha 0 \leq 4$.

By setting the ratio so as to satisfy $1 \leq \alpha 0 \leq 4$, losses at the magnetic core can be reduced without impairing the magnetic field generation efficiency with respect to the current. Therefore, when the high-frequency modulation is performed, excellent characteristics can be obtained even if a low-cost magnetic core and coil are used, and these can be used in a temperature range with high reliability. Consequently, it is possible to provide an excellent magnetic head that provides both advantages of high performance and low cost.

BRIEF DESCRIPTION OF DRAWINGS

FIG. 2A is a graph showing how a driving current varies as a ratio $\alpha 0$ is varied, concerning the magnetic head according to the first embodiment of the present invention, and FIG. 2B is a graph showing how losses vary as the ratio $\alpha 0$ is varied, concerning the magnetic head.

FIG. 4 is a perspective view illustrating a magnetic core employed in a magnetic head according to a second embodiment of the present invention.

DESCRIPTION OF THE INVENTION

The following will describe embodiments of the present invention, while referring to FIGS. 1 to 7.

First Embodiment

Figure 1:
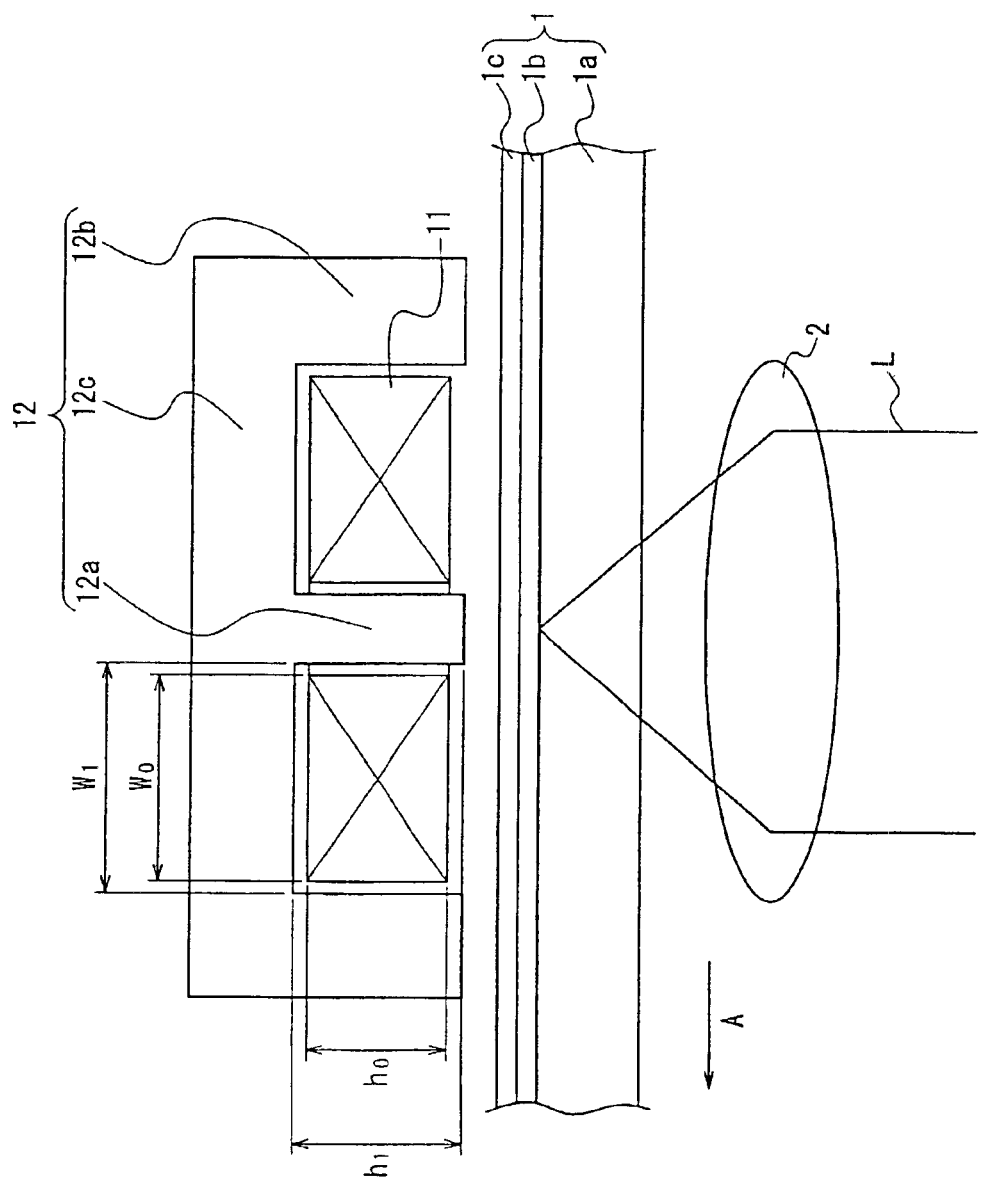
FIG. 1 is a cross-sectional view illustrating a magnetic head according to a first embodiment of the present invention.

FIG. 1 is a cross-sectional view illustrating principal parts of a magnetic head according to the first embodiment of the present invention. A recording medium 1 and an objective lens 2, including details thereof, are identical to those of the conventional example shown in FIG. 8, and they function in the same manner. The same constituent members as those shown in FIG. 8 are designated with the same reference numerals, and detailed descriptions of the same are omitted herein.

Figure 8:
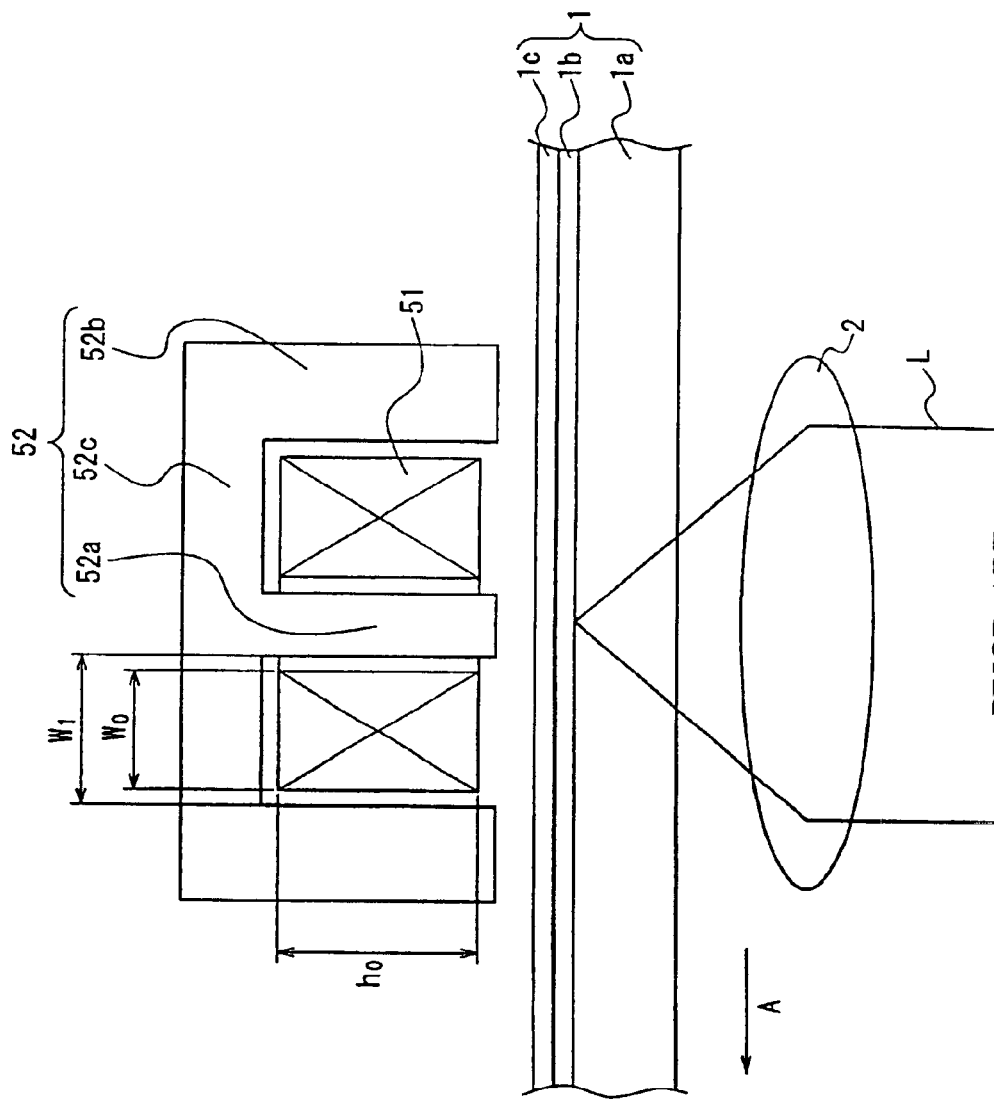
FIG. 8 is a cross-sectional view illustrating a conventional magnetic head.

A coil 11 and a magnetic core 12 are identical to those of the conventional example shown in FIG. 8 except for their shapes. The coil 11 is wound and fixed around a center yoke 12a of the magnetic core 12. Side yokes 12b are provided on both sides of the center yoke 12a, in parallel with the center yoke 12a. The center yoke 12a and the side yokes 12b are integrated via a base yoke 12c, so as to compose the magnetic core 12.

The magnetic core 12 is in an "E" letter shape, and has an approximately constant thickness (the thickness in a direction perpendicular to the plane of the paper carrying FIG. 1). The coil 11 may be fixed to the magnetic core 12 by, for instance, bonding, etc., or alternatively, the coil 11 may be wound around a bobbin (not shown) that is attached by insertion fixedly to the center yoke 12a. The coil 11 and the magnetic core 12 compose a magnetic head.

In FIG. 1 showing a cross section taken along a plane containing a central axis (not shown) of the winding of the coil 11, which is approximately parallel to a magnetic flux passing through the center yoke 12a, $h0$ and $w0$ denote a height and a width on one side, respectively, of the cross section of the coil 11, as in the conventional example. More specifically, $h0$ and $w0$ denote a dimension of the coil 11 in a direction parallel to an excitation direction of the coil 11 and a dimension thereof in a direction perpendicular to the excitation direction, respectively.

Furthermore, $h1$ denotes a length of the center yoke 12a, and $w1$ denotes a distance between the center yoke 12a and the side yoke 12b on one side.

Here, the following will describe a case where $w0 \times h0$ substantially remains constant, that is, a cross-sectional area occupied by the coil 11 remains constant. This substantially is equivalent to a state in which the number of turns is constant in the case where a wire diameter of the coil 11 is set to be a certain value, and this means a condition in which a self-inductance is limited to a substantially constant value, which is important for implementing the high-frequency modulation.

For convenience in writing, a dimension ratio $w0/h0$ of the cross-sectional shape of the coil is defined to satisfy $w0/h0 = \alpha 0$.

FIGS. 2A and 2B illustrate how the characteristics of the magnetic head at a certain specific modulation frequency vary as α0 is varied while w0/h0 of the coil 11 is set constant. As α0 increases, that is, in the right-side regions of the graphs, the coil becomes a so-called thinner coil. The shape of the magnetic core 12 also is varied according to the variation of the shape of the coil 11. In other words, when a dimension ratio w1/h1 is defined to satisfy w1/h1≡α1, α1=α0 is satisfied.

FIG. 2A illustrates how a driving current amplitude of the coil 11 needed for obtaining a necessary intensity of the modulated magnetic field varies according to α0. The graph shows that, at least in a range satisfying α0>0.5, more current is needed for obtaining a necessary magnetic field as α0 increases. From the viewpoint of the current efficiency, in the region shown in the drawing, a smaller α0 is more advantageous. This is as shown in conjunction with the conventional example.

FIG. 2B illustrates how the resistance (real part of an impedance) of the magnetic head in a modulation band varies with α0. Here, the resistance is separated into a coil loss portion and a core loss portion. The total resistance exhibits variation in a hyperbolic curve with respect to α0, increasing as α0 decreases and substantially remaining constant when α0>3. In the breakdown of the losses, to state roughly, the core loss is greater when α0<1.6, and the coil loss is significant when α0>1.6.

In other words, as predicted, as h0 increases, that is, α0 decreases, the core loss significantly increases since a volume in an area with a high magnetic-flux density increases. In contrast, as α0 increases, the coil loss increases since a total length of the coil increases. It should be noted that the core loss has a great sensitivity to the variation of α0, while the variation of the coil loss is relatively dull to the same.

Figure 3:
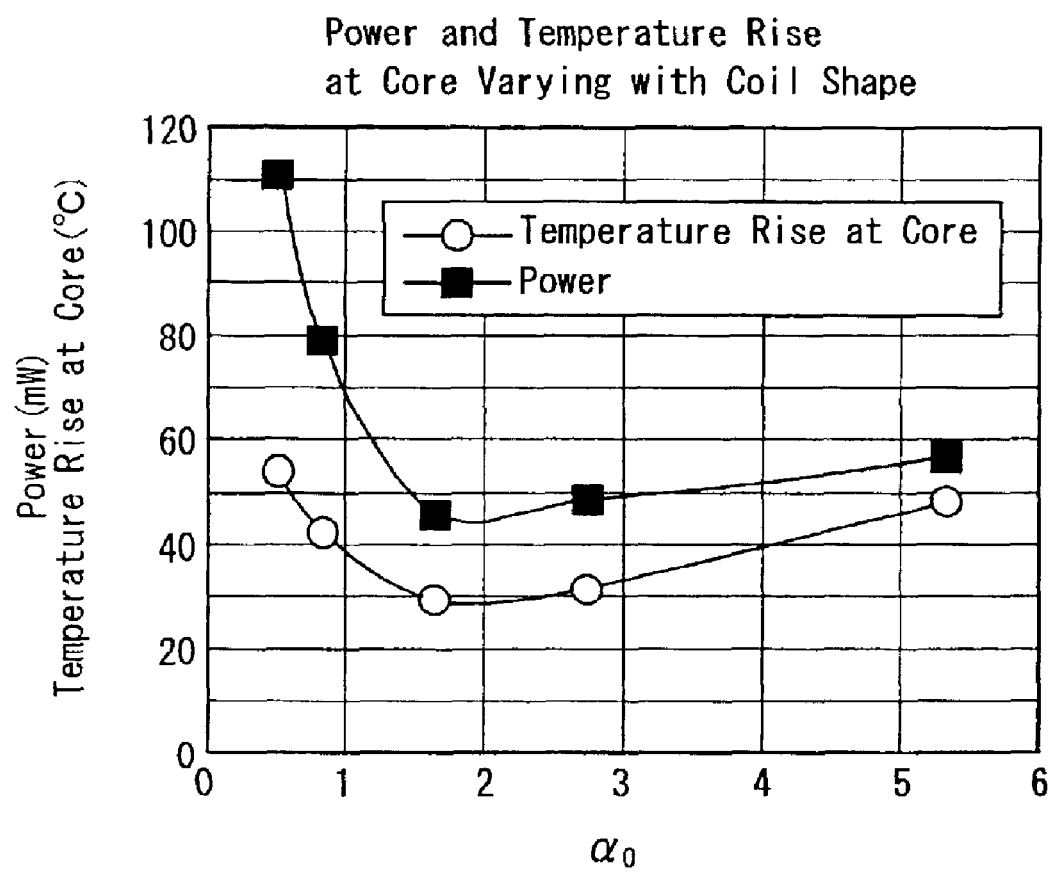
FIG. 3 is a graph showing how the power consumption and the temperature rise at a magnetic core vary as the ratio $\alpha 0$ is varied, concerning the magnetic head according to the first embodiment of the present invention.

FIG. 3 is a graph illustrating the relationship of the power consumed at the magnetic head and the temperature rise at the magnetic core with respect to α0. Here, the power is a product of a square of the driving current shown in FIG. 2A and the total resistance shown in FIG. 2B.

The power and the temperature rise at the core exhibit substantially similar curves with respect to α0, and the both have minimum values when α0 is in the vicinity of 1.9. This is because when α0 is small, the power increases since the loss at the magnetic core increases, and when α0 is large, the power also increases since the driving current and the loss at the coil increase. Therefore, from the viewpoint of the power, the points of the minimum values appear midway therebetween.

As to portable apparatuses, it is not unusual that they are used at an ambient temperature of approximately 40° C., and the temperature inside the apparatuses occasionally rises to at least 20° C. higher than that, namely, approximately 60° C. In this case, for instance, in the case where the coil 11 is coated with polyamide from the viewpoint of the cost reduction, a critical temperature for heat resistance thereof is approximately 100° C., and therefore, an acceptable temperature rise is +40° C. A selectable range of α0 in this case is 1≦α0≦4 as seen in FIG. 3.

Furthermore, likewise, assuming that a temperature rise margin is approximately 10° C., the acceptable temperature rise is +30° C., and therefore, the selectable range of α0 is 1.5≦α0≦2.5.

It should be noted that a smaller driving current is preferred considering the power for the entire system. As shown in FIG. 2A, the driving current monotonically increases with respect to α0, and hence the minimum α0 in the selectable range should be selected. Therefore, in the case where the acceptable temperature rise is +30° C., an optimal solution derived by taking the entirety into account could be such that α0 is approximately 1.5. FIG. 1 illustrating the present embodiment is drawn assuming that α0≈1.5, based on the foregoing technical idea.

Since α0 in FIG. 8, described in conjunction with the conventional example, is approximately 0.5, the temperature rise is approximately 55° C. according to FIG. 3. Accordingly, when a temperature inside an apparatus is 60° C., the magnetic core has a temperature of 115° C. Generally, a magnetic core material having a greater magnetic permeability has a lower Curie temperature, and there are magnetic core materials with Curie temperatures at a level of 110° C. Therefore, it can be determined easily from FIG. 3 that the configuration of the conventional example could cause the deterioration of performance of the magnetic head and the thermal runaway.

In contrast, by applying the present embodiment, the temperature rise at the magnetic core can be avoided readily. Therefore, even in the case where a low-cost magnetic core material with a high magnetic permeability and a low-cost coil are employed, they can be used in an appropriate temperature range, and the deterioration of performance of the magnetic core as well as the thermal runaway can be avoided.

The operations of the magnetic head according to the present embodiment are identical to those of the conventional example, and hence their descriptions are omitted herein.

It should be noted that in the present embodiment, though a wire material for the coil 11 is not specified in particular, a Litz wire formed by stranding a plurality of coated thin wires may be used, so as to obtain an improved Q-value, as well as a resonance point at a higher frequency. This is because the skin effect can be used effectively, and the capacitive coupling between adjacent wires can be reduced. Consequently, it is possible to decrease the coil loss at a high frequency, thereby providing a magnetic head with improved performance.

Second Embodiment

FIG. 4 is a perspective view illustrating only a magnetic core of a magnetic head according to the second embodiment of the present invention. A magnetic core 22 differs from the magnetic core 12 used in the first embodiment only in the shape, and is identical to the same in the materials, etc. On a base yoke 22c in a rectangular plate shape, a center yoke 22a with a height h1 is provided substantially at the center, and two side yokes 22b are provided at symmetrical positions at a distance w1 each from the center yoke 22a, so as to protrude from the base yoke 22c. Though not shown, a coil is wound and fixed around the center yoke 22a in the same manner as that in the first embodiment. Thus, a magnetic head is formed.

The present embodiment is supported by substantially the same theoretical background as that of the first embodiment, and a ratio α1(=w1/h1) as to the magnetic core 22 and a ratio α0(=w0/h0) as to the coil, not shown, are set to be approximately 1.5 each.

A width tB of the base yoke 22c in a direction orthogonal to both the direction of the height h1 and the direction of the distance w1 is greater than a width tC of the center yoke 22a in the same direction.

In the present embodiment, since the base yoke 22c is in the plate form and satisfies tB>tC, the magnetic resistance further decreases as compared with the first embodiment, and hence, the efficiency increases by several percents.

Third Embodiment

Figure 5:
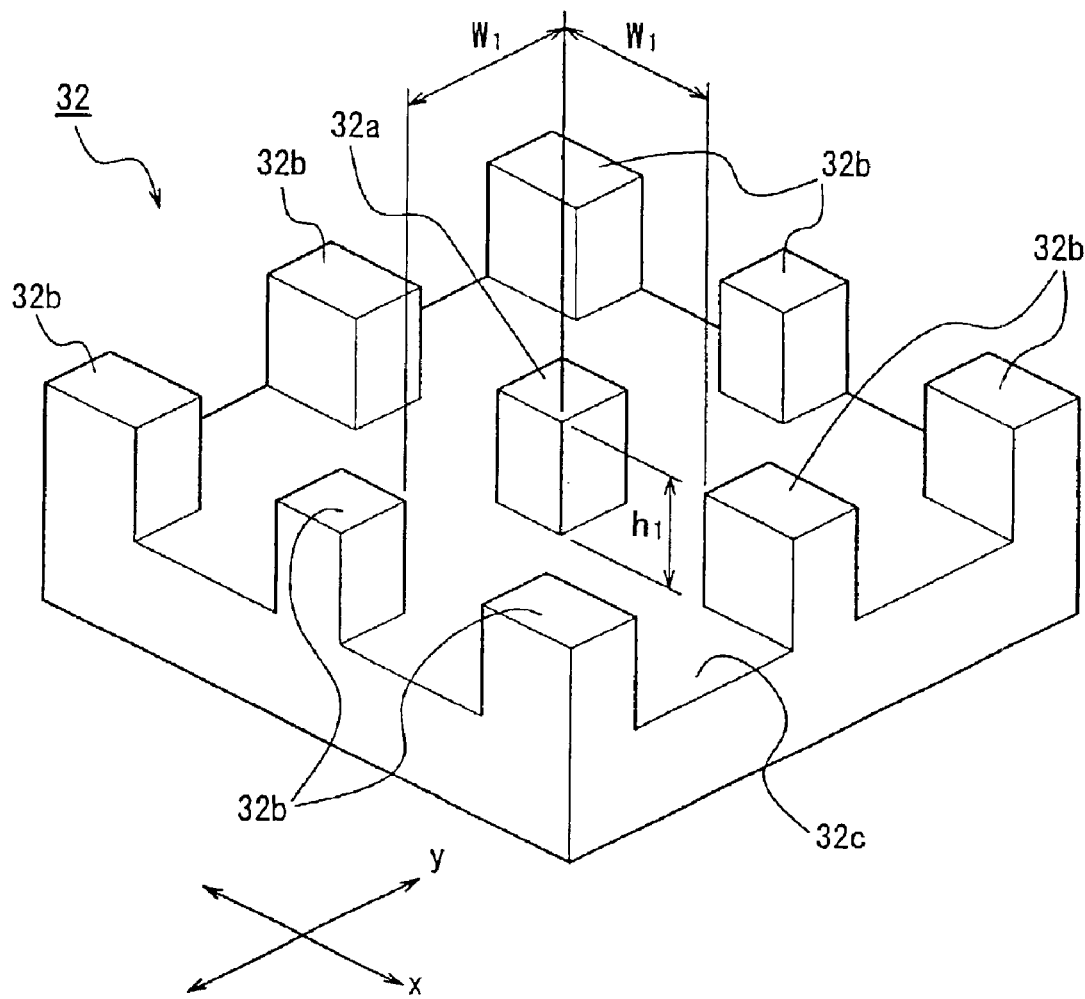
FIG. 5 is a perspective view illustrating a magnetic core employed in a magnetic head according to a third embodiment of the present invention.

FIG. 5 is a perspective view illustrating only a magnetic core of a magnetic head according to the third embodiment of the present invention. A magnetic core 32 differs from the magnetic core 32 used in the second embodiment only in the shape, and is identical to the same in the materials, etc. On a base yoke 32c in a rectangular plate shape, a center yoke 32a with a height h1 is provided substantially at the center. Two side yokes 32b are provided at symmetrical positions at a distance w1 each from the center yoke 32a in an x direction shown in the drawing (direction parallel to one side of the base yoke 32c), two side yokes 32b are provided at symmetrical positions at a distance w1 each from the center yoke 32a in a y direction (direction orthogonal to the x direction), and further, at each corner of the base yoke 32c, a side yoke 32b is provided. Though not shown, a coil is wound and fixed around the center yoke 32a in the same manner as that in the first embodiment. Thus, a magnetic head is formed.

In the present embodiment, a ratio $\alpha 1(=w1/h1)$ as to the magnetic core 22 and a ratio $\alpha 0(=w0/h0)$ as to the coil (not shown) are set to be approximately 1.5 each, as substantially identical to the second embodiment.

In the present embodiment, since eight side yokes 32b in total are arranged so as to surround the center yoke 32a, the magnetic resistance further decreases, thereby further improving the efficiency, as compared with the second embodiment.

Fourth Embodiment

Figure 6:
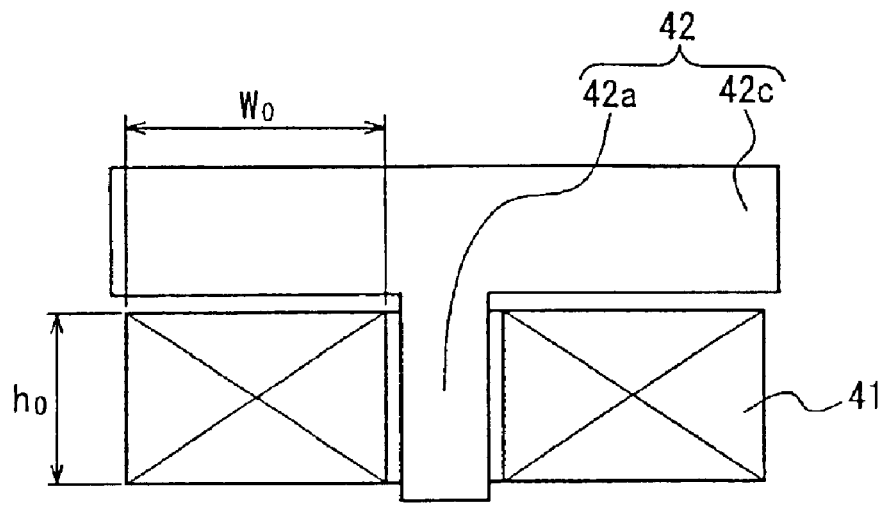
FIG. 6 is a cross-sectional view illustrating a magnetic head according to a fourth embodiment of the present invention.

FIG. 6 is a cross-sectional view illustrating principal parts of a magnetic head according to the fourth embodiment of the present invention. A coil 41 is the same as the coil 11 in the first embodiment. A magnetic core 42 differs from the magnetic core 12 in the first embodiment only in the shape, and is identical to the same in the materials, etc.

Figure 7:
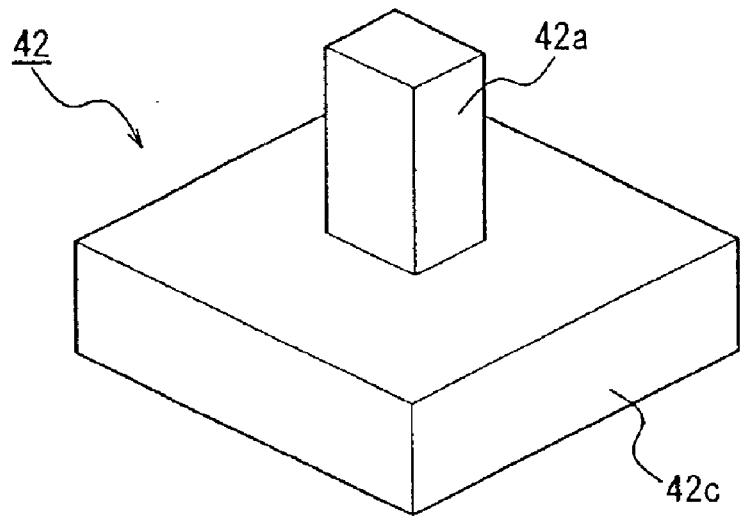
FIG. 7 is a perspective view illustrating a magnetic core employed in the magnetic head according to the fourth embodiment of the present invention.

FIG. 7 is a perspective view illustrating an overall shape of the magnetic core 42. A center yoke 42a is provided substantially at the center of a base yoke 42c in a rectangular plate shape, so as to protrude therefrom. A coil 41 is wound and fixed around the center yoke 42a in the same manner as that in the first embodiment.

The present embodiment also is supported by substantially the same theoretical background as that of the first embodiment, and a ratio $\alpha 0(=w0/h0)$ as to the coil 41 is set to be approximately 1.5. Therefore, an excellent magnetic head suitable for high-frequency modulation is provided.

Thus, the foregoing embodiments are described by taking as an example the case where a MD is used as a recording medium, but the present invention is not limited to this. The present invention is applicable to any apparatus or medium for use with a magnetic head that performs the high-frequency magnetic field modulation.

Furthermore, it is possible to configure the magnetic head so that one side yoke is provided, according to an apparatus used.

Furthermore, in conjunction with the foregoing embodiments, the cases where the side yokes have the same height as that of the center yoke are shown in the drawings, but it also is possible to make the side yokes slightly lower in height than the center yoke, according to a design.

Furthermore, each base yoke in the second to fourth embodiments is rectangular in the plan-view shape, but certain notches or grooves for the leading out or fixing of the coil wires or other purposes may be provided, and this does not constitute a deviation from the scope of the present invention.

The embodiments described above merely intend to clarify technical details of the present invention and the present invention should not be interpreted as being limited to such specific examples. The present invention can be carried out by being modified variously within a range of claims and without departing from its spirit and should be interpreted broadly.

What is claimed is:

1. A magnetic head comprising a magnetic core for mainly applying a modulated magnetic field to a magneto-optical recording medium, and a coil wound around the magnetic core, wherein the modulated magnetic field generated by modulating a current flowing through a coil in accordance with a recording signal is applied locally to a portion of the magneto-optical recording medium in which a coercive force is reduced by irradiation of a laser beam, so that information is recorded on the magneto-optical recording medium, and wherein a ratio $\alpha 0$ satisfies:

$$1 \leq \alpha 0 \leq 4$$

where $\alpha 0 = w0/h0$, and h0 and w0 represent dimensions of a cross-sectional area of the coil taken along a plane substantially orthogonally crossing a direction in which charges move when current is passed through the coil, h0 and w0 representing a dimension of the cross-sectional area in an excitation direction of the coil, and a dimension of the same in a direction perpendicular to the excitation direction, respectively.

2. The magnetic head according to claim 1, wherein the ratio $\alpha 0$ satisfies:

$$1.5 \leq \alpha 0 \leq 2.5.$$

3. The magnetic head according to claim 1, wherein the magnetic core includes a center yoke arranged so as to face the medium, a side yoke provided substantially in parallel with the center yoke, and a base yoke connecting the center yoke and the side yoke at their ends on a side opposite to a side facing the medium, the coil is wound around the center yoke, and a ratio $\alpha 1$ satisfies:

$$1 \leq \alpha 1 \leq 4$$

where $\alpha 1 = w1/h1$, and w1 represents a distance between the center yoke and the side yoke, and h1 represents a distance from a surface of the center yoke facing the medium to the base yoke.

4. The magnetic head according to claim 3, wherein the ratio $\alpha 1$ satisfies:

$$1.5 \leq \alpha 1 \leq 2.5.$$

5. The magnetic head according to claim 3, wherein the base yoke is in an approximate plate shape having a normal directed in an h1 direction in which the distance h1 extends, and a maximum width of the base yoke in a t direction is greater than a width of the center yoke in the same direction, the t direction being a direction orthogonally crossing both of the h1 direction and a w1 direction in which the distance w1 extends.

6. The magnetic head according to claim 1, wherein a wire of the coil is a multifilament stranded wire.

7. The magnetic head according to claim 1, wherein a vicinity of a coil-wound portion of the magnetic core is in an approximate "E" shape.

8. The magnetic head according to claim 1, the magnetic core includes one center yoke and a plurality of side yokes, and the magnetic core has a cross section in an approximate "E" shape taken along a plane that contains the center yoke and the side yokes and that substantially is parallel to a magnetic flux passing through the center yoke.

* * * * *